(12) United States Patent
Cai et al.

(10) Patent No.: US 11,250,347 B2
(45) Date of Patent: Feb. 15, 2022

(54) PERSONALIZATION ENHANCED RECOMMENDATION MODELS

(71) Applicant: Microsoft Technology Licensing, LLC, Redmond, WA (US)

(72) Inventors: Yaxiong Cai, Issaquah, WA (US); Xiaoguang Qi, Bellevue, WA (US); Kiyoung Yang, Sammamish, WA (US); Shih-Chieh Su, Redmond, WA (US); Saliha Azzam, Redmond, WA (US); Jayaram N. M. Nanduri, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 608 days.

(21) Appl. No.: 16/134,726

(22) Filed: Sep. 18, 2018

(65) Prior Publication Data

US 2020/0005196 A1 Jan. 2, 2020

Related U.S. Application Data

(60) Provisional application No. 62/690,595, filed on Jun. 27, 2018.

(51) Int. Cl.
*G06N 20/00* (2019.01)
*G06N 5/02* (2006.01)
*G06F 9/30* (2018.01)

(52) U.S. Cl.
CPC ......... *G06N 20/00* (2019.01); *G06F 9/30036* (2013.01); *G06N 5/02* (2013.01)

(58) Field of Classification Search
CPC ...................................................... G06N 5/02
See application file for complete search history.

(56) References Cited

U.S. PATENT DOCUMENTS 6,438,579 B1 8/2002 Hosken
7,113,917 B2 9/2006 Jacobi et al.
(Continued)

FOREIGN PATENT DOCUMENTS

CN 103955535 A 7/2014

OTHER PUBLICATIONS

Modarresi (Recommendation System Based on Complete Personalization, Jun. 2016, pp. 2190-2204) (Year: 2016).*
(Continued)

*Primary Examiner* — George Giroux
(74) *Attorney, Agent, or Firm* — Fiala & Weaver P.L.L.C.

(57) ABSTRACT

Methods, systems, apparatuses, and computer program products are provided for a two-phase technique for generating content recommendations. In a first phase, a baseline recommender is configured to generate a baseline content recommendation using one or more content recommendation models, such as a Smart Adaptive Recommendations (SAR) model, Factorization Machine (FM) or Matrix Factorization (MF) models, collaborative filtering models, and/or any other machine-learning models or techniques. In a second phase, a personalized recommender implements a vector combiner configured to combine profile vectors, content vectors, and the baseline content recommendations to generate combined user vectors. A model generator may train a machine-learning model using the combined user vectors and training data comprising actual interaction behavior of the users, which may be then applied to identify a content recommendation for a particular user.

20 Claims, 5 Drawing Sheets

(56) References Cited

U.S. PATENT DOCUMENTS

| | | | |
|---|---|---|---|
| 8,103,555 B2 | 1/2012 | Lee et al. | |
| 8,108,329 B2 | 1/2012 | Selinger et al. | |
| 8,745,074 B1* | 6/2014 | Covell | G06F 16/9535 |
| | | | 707/758 |
| 9,208,155 B2 | 12/2015 | Nice et al. | |
| 9,473,730 B1* | 10/2016 | Roy | H04H 60/45 |
| 9,633,119 B2 | 4/2017 | Wexler | |
| 2009/0307057 A1* | 12/2009 | Azout | G06Q 30/02 |
| | | | 705/7.29 |
| 2010/0125585 A1* | 5/2010 | Chu | G06F 16/313 |
| | | | 707/748 |
| 2013/0290110 A1* | 10/2013 | LuVogt | G06F 16/9535 |
| | | | 705/14.66 |
| 2014/0280251 A1* | 9/2014 | Somekh | G06F 16/9535 |
| | | | 707/754 |
| 2015/0088911 A1 | 3/2015 | Qiao et al. | |
| 2019/0279231 A1* | 9/2019 | Ning | G06Q 30/0202 |

OTHER PUBLICATIONS

Agrawal, Abhishek, "Recommendations Solution", Retrieved from: https://gallery.azure.ai/Tutorial/Recommendations-Solution, Jun. 20, 2017, 4 Pages.

"International Search Report and Written Opinion Issued in PCT Application No. PCT/US2019/038080", dated Aug. 13, 2019, 13 Pages.

* cited by examiner

PERSONALIZATION ENHANCED RECOMMENDATION MODELS

CROSS-REFERENCE TO RELATED APPLICATIONS

This application claims priority to U.S. Provisional Patent Application No. 62/690,595, filed on Jun. 27, 2018, titled "Personalization on Top of Recommendation Models Using Gradient Boosted Trees," the entirety of which is incorporated by reference herein.

BACKGROUND

Users may interact with a wide variety of multimedia content on computing devices, such as desktop computers, laptops, mobile devices, and gaming consoles. For example, users may access video content, image content, audio content, gaming content, etc., on a single computing device. In many instances, content may be suggested to a user based on a number of techniques, such as based on an overall popularity of the content or other recommendation algorithm. Where popularity trends are relied upon in systems that suggest content to users, it is assumed that users are more likely to access the same content that other users have accessed. However, systems which suggest content based solely on popularity trends result in users all being shown the same content offerings. Furthermore, recommendation algorithms often result in recommending content that is inaccurate or not likely to be relevant to a user.

In addition, on certain devices such as gaming consoles, while content may be suggested to a user using techniques as described above, the quantity of content offerings that may be displayed at once is typically limited by the space available on a graphical user interface provided by the console (e.g., displayed on a television or other display screen). Furthermore, where the user interface also includes other static interface elements (e.g., a menu bar or the like), the amount of space available for displaying content options becomes even more limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for a two-phase technique for generating content recommendations. In a first phase, several baseline content recommendations are generated. In a second phase, a personalized recommender comprises a vector combiner and a model generator. The vector combiner is configured to combine profile vectors, content vectors, and the baseline content recommendations to generate combined user vectors. The model generator may train a machine-learning model using the combined user vectors and training data comprising tracked interactions of the users. Once trained, a user vector for a particular user may be applied to the model to identify a content recommendation for the user.

Using a two-phase approach as described herein enables content recommendations to be generated with increased accuracy, quality, and efficiency than techniques using a single content recommendation model. For instance, because the two-phase approach takes into account tracked interactions of users during a training phase, the generated model may be configured to identify content recommendations that are more likely to be deemed relevant and/or interesting to users based on recent user behaviors.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
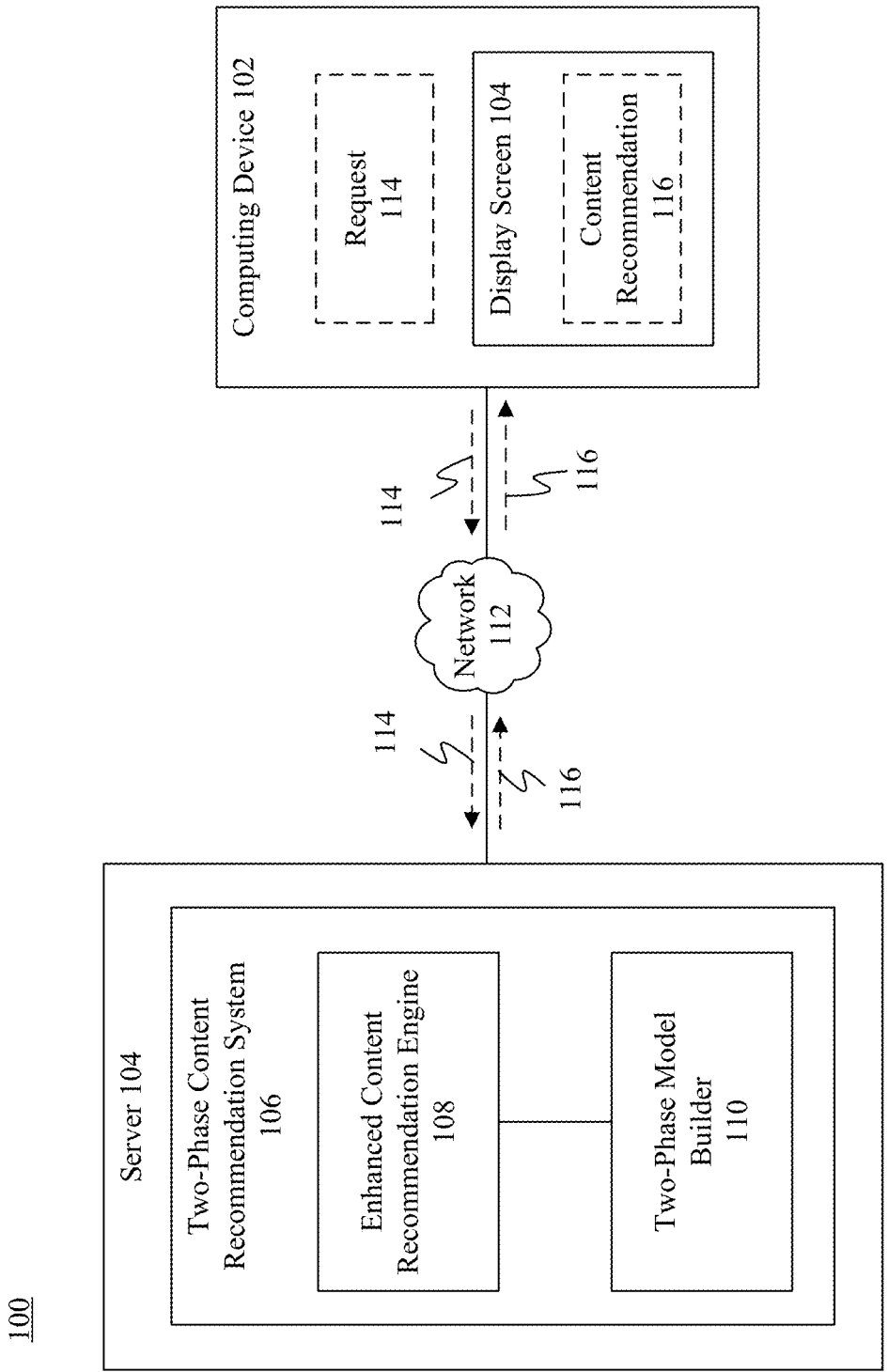
FIG. 1 shows a block diagram of a system for providing content recommendations to a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

As noted in the Background section above, users may interact with a wide variety of multimedia content on computing devices, such as desktop computers, laptops, mobile devices, and gaming consoles. For example, users may access video content, image content, audio content, gaming content, etc., on a single computing device. In many instances, such content may be suggested to a user based on a number of techniques, such as based on an overall popularity of the content or other recommendation algorithm. Where popularity trends are relied upon in systems that suggest content to users, it is assumed that users are more likely to access the same content that other users have accessed. However, systems which suggest content based solely on popularity trends result in users all being shown the same content offerings. Furthermore, recommendation algorithms often result in recommending content that is inaccurate or not relevant to a user.

In addition, on certain devices such as gaming consoles, while content may be suggested to a user using techniques as described above, the quantity of content offerings that may be displayed at once is typically limited by the space available on a graphical user interface generated by the console (e.g., displayed on a television or other display screen). Furthermore, where the user interface also includes other static interface elements (e.g., a menu bar or the like), the amount of space available for displaying content options becomes even more limited.

Implementations described herein address these and other issues by enabling the generation of content recommendations using a two-phase model builder. In a first phase, baseline content recommendations are generated using one or more recommendation techniques, such as by implementing a Smart Adaptive Recommendations (SAR) model, Factorization Machine (FM) or Matrix Factorization (MF) models, collaborative filtering models, and/or any other machine-learning models or techniques. In a second phase, the baseline content recommendations may be ingested, along with content interaction data and profile information, in a personalized recommender. Content interaction data may indicate historical interaction data for a plurality of users across a plurality of different content types (e.g., click information). Profile information may comprise other historical personal information for the plurality of users (e.g., non-content specific behavioral information). The personalized recommender may combine the baseline content recommendations, the content interaction data, and the profile information and train a machine-learning model using training data comprising tracked interactions over a given time period to generate an enhanced, personalized content recommendation model.

In some implementations, accuracy, quality, and/or efficiency may be further enhanced where content item information is known (e.g., in a user-item matrix), and the quantity of content items for recommendations is relatively small (e.g., under 100), although embodiments are not limited to such implementations.

Using such a two-phase approach has numerous advantages. For example, a two-phase approach as described herein enables content recommendations to be generated with increased accuracy, quality, and efficiency than a single content recommendation model. Accordingly, the two-phase technique may enable an improved (e.g., more optimal) set of content may be recommended to each user, thereby increasing the chance the user's interest is captured, and increasing the user's engagement with the system on which the content is provided and/or accessed. As a result, the user need not expend significant resources in navigating a user interface of the computing device to determine which content to access, but rather may be provided relevant content based on actual interaction information and behavioral habits in combination with a number of other factors, such as outputs of one or more other recommendation models. Because the relevance and quality of recommended content is increased, less display real estate may be used for content recommendation, thus freeing up display space for other graphical user interface elements.

In addition to enhancing a graphical user interface, the two-phase model building techniques described herein further enable a reduction of the computing resources for the system responsible for determining or providing content recommendations. For instance, because the system determining or providing the content recommendations may generate a two-phase recommendation model that is configured to generate content recommendations for a period of time (e.g., a week), the frequency at which the model is generated and trained may be decreased, thereby reducing the computing resources needed. Furthermore, because the model may generate more accurate and relevant content recommendations, the user is less likely to continue to browse through other available content to access (e.g., by browsing through a content store, searching for content that matches the user's interests, etc.), thereby decreasing the network resources utilized by the computing device accessing content, as well as one or more servers making such content available for accessing. As a result, freeing up such network resources may enable the server to transmit the selected content at faster speeds and/or higher quality, further enhancing a user's enjoyment of the system.

Example implementations are described as follows that are directed to techniques for generating a machine-learning model for providing a content recommendation. For instance, FIG. 1 shows a block diagram of an example enhanced content recommendation system 100, according to an embodiment. As shown in FIG. 1, system 100 includes a computing device 102 and a server 104, which are communicatively coupled by a network 112. Server 104 includes a two-phase content recommendation system 106. Network 112 may comprise one or more networks such as local area networks (LANs), wide area networks (WANs), enterprise networks, the Internet, etc., and may include wired and/or wireless portions. Computing device 102 is communicatively connected to server 104 via network 112. In an implementation, computing device 102 and server 104 may communicate via one or more application programming interfaces (API), and/or according to other interfaces and/or techniques.

Computing device 102 may comprise a device configured to output a video signal comprising one or more video frames to a display screen 104. Computing device 102 may comprise a video game console (e.g., a Microsoft Xbox® of any version, a Sony PlayStation® of any version, a Nintendo Wii®, NES, or Switch™ of any version, etc.), a desktop computer, a portable computer, a smartphone, a tablet, a wearable computing device, a head mounted gaming device, a mixed and/or virtual reality device (e.g., Microsoft HoloLens™), or any other processing device for executing a video game and outputting video frames generated by the video game to a display device. It is understood that although computing device 102 is described in example embodiments as relating to gaming devices, computing device 102 may comprise any type of electronic device (computer, smartphone, tablet, etc.) capable of displaying (e.g., on a screen) or playing back (e.g., on a speaker or the like) any type of multimedia content, such as video content, audio content, audio/video content, images, etc. Although FIG. 1 depicts a single computing device 102, it is understood that implementations may comprise any number computing devices (e.g., gaming consoles) coupled to network 112 and/or server 104. An example computing device that may incorporate the functionality of one of computing device 102 is described below in reference to FIG. 7.

As shown in FIG. 1, computing device 102 includes display screen 104. Display screen 104 may comprise any type of display suitable for receiving and displaying video frames generated by a video game. For instance, display screen 104 may be a liquid crystal display, cathode ray tube display, light-emitting diode display, a plasma display, a display screen of a projector television, or any other type of display that may be coupled to computing device 102 through a suitable interface. Display screen 104 of computing device 102 may either be external to or incorporated in computing device 102.

In accordance with example embodiments, display screen 104 may present a content recommendation 116 (or a plurality of content recommendations) via a graphical user interface (GUI). Content recommendations 116 may include one or more items of content recommended for interaction by a user of computing device 102. For instance, display screen 104 may display a plurality of content boxes suitable for displaying or presenting content recommendations. In one example, a home page of a GUI may comprise a fixed (e.g., two) or variable number of content recommendation boxes to populate based on a total number of content types (e.g., 24 content types) that may be recommended. In an illustrative implementation, content recommendation blocks may provide gaming-related content recommendations (e.g., "your friend Bob is playing FIFA 2017, would you like to join?", or "Your friend Amy is currently broadcasting, would you like to watch?").

In accordance with implementations, computing device 102 may transmit a request 114 comprising a request for a content recommendation to server 104 over network 112. In response to request 114, computing device 102 may receive a content recommendation 116 based on a number of factors, as described below, and display such a recommendation of content on display screen 104. In implementations, a user may interact with computing device 102 (e.g., via a voice interaction, a touch input interaction, a keyboard interaction, a pointing device interaction, a game controller or joystick interaction, etc.) to select a particular recommended content item for interaction, such as for viewing, playback, or gameplay.

As shown in FIG. 1, server 104 comprises two-phase content recommendation system 106. In implementations, two-phase content recommendation system 106 is configured to provide a content recommendation 116 to computing device 102, as described in more detail below. Two-phase content recommendation system 106 comprises an enhanced content recommendation engine 108 and a two-phase model builder 110. Server 104 may include one or more server devices and/or other computing devices comprising, for instance, a cloud-based computing platform. Server 104 may also be communicatively coupled to a storage or other repository (locally or remotely located to server 104).

A storage device communicatively coupled to server 104 may be configured to store a plurality of user event records associated with computing device 102. The user event records may comprise, for instance, an identity of a user (e.g., a name, email address, alias, etc.) of computing device 102 and one more actions performed on the computing device. For example, the user event records may indicate that a particular user accessed a certain content type associated with an item of media content, such as a video game. In some implementations, the user event records may also identity a timestamp or duration associated with each such logged event record. As an illustrative example, a user event record may indicate that a particular user of one of computing device 102 joined a certain multi-player game and interacted with the game for a certain period of time. Further examples of user event records for a user may indicate the user quit a game, earned an achievement in a game, reached a particular score in a game, shared an image or video clip from a game, made an in-game purchase, etc.

The storage device may store or log each such event record for each user, such as in an event catalog. In implementations, the event catalog may store user event records associated with hundreds, thousands, millions, and even greater numbers of users over an entire ecosystem. The event catalog may comprise any suitable data structure for storing such user event records, including but not limited to a database, a spreadsheet, a table, a log file, etc. Although the event catalog may be implemented in a storage device communicatively coupled to server 104, it is understood that the event catalog may be implemented in or distributed across one or more additional storage devices. Furthermore, the storage device may be implemented separate from server 104, implemented within server 104, and/or may be located remotely such that the storage may be accessed by server 104 via network 112. The storage device may comprise any type of physical storage device, including but not limited to one or more local storage devices, and/or one or more cloud-based storages, such as hard disk drives, solid state drives, random access memory (RAM) devices, etc.

Content may originate or be derived from publishers, editorial programming and community managers, or from a user of computing device 102. Content types as described herein may include, but are not limited to: friends online playing a joinable game session; looking for group content (LFG) (e.g., an available LFG count, or an LFG posted by a friend or club member, a tournament LFG posted by a friend or club member); tournament details for registered users; game started supporting tournaments; club recommendations; a friend finder (e.g., via one or more social media platforms); a friend suggestion/recommendation; a friend currently broadcasting or co-broadcasting; popular media posts (e.g., community game clips or screenshots); popular community broadcasts; community manager posts; achievement suggestions (e.g., rarest unearned achievement across games, most common unearned achievement across games, closest via progression across games, such as closest to unlock or completion, remaining gamer score or achievements available across games, close behind a next user in a gamer score leaderboard); a leaderboard suggestion (e.g., close behind a next user in a stats leaderboard or a stats leaderboard snapshot); store content (e.g., recently released unowned downloadable content or other downloadable content recommendation), and/or any other suitable content types. Such example content types are provided for purposes of illustration, and it is to be understood that embodiments are applicable to any suitable content type. It is noted that content types may also be clustered and/or categorized in accordance with techniques described here. For instance, scores may be generated based on clusters or categories of content types (e.g., LFG related content).

Computing device 102 and server 104 may each include at least one network interface that enables communications with each other over network 112 Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 112 include a local area network (LAN), a wide area network (WAN), a personal area network (PAN), and/or a combination of communication networks, such as the Internet.

In implementations, enhanced content recommendation engine 108 may be configured to receive request 114 from computing device 102 for content to recommend. Based on request 114, enhanced content recommendation engine 108 may identify content to recommend using a machine learning model generated by two-phase model builder 110 and transmit such content recommendation 116 to computing device 102 via network 112.

Two-phase model builder 110 may generate the machine-learning model in various ways, as will be described in greater detail below. For example, two-phase model builder 110 may generate the model using a multi-phase approach. In a first phase, a baseline content recommendation may be generated using one or more baseline content recommendation models, such as a SAR model, FM or MF model, collaborative filtering model, and/or any other machine learning models or techniques. The baseline recommendation content recommendation may include a content recommendation (or ranked set of recommendations) for each of a plurality of users and a plurality of content types. In one example that will be described later, the baseline content recommendation may comprise a matrix of users and content types identifying the one or more content types for which each user is most likely to interact with.

In a second phase, a plurality of vectors may be generated and combined. For instance, profile vectors may be generated based on user profile information and content vectors may be generated based on content interaction data of the users. Profile vectors, content vectors, and the baseline content recommendation may be combined together to generate a single user vector for each of the users. Based on the user vectors and interaction training data corresponding to tracked interactions of the users (e.g., indicating whether one or more users have interacted with each of the target content types), a supervised machine-learning algorithm may generate and train a recommendation model. In some instances, the user vectors may be generated corresponding to a first time period (e.g., the past year minus the most recent week), while the interaction training data may be retrieved for a second time period (e.g., the most recent week) that is more recent and optionally shorter than the first time period. By applying a vector corresponding to a particular user to the recommendation model during an evaluation stage, a content recommendation may be generated and subsequently transmitted to computing device 102.

In the illustrative example described above, because a total number of content types may be a relatively small number (e.g., 24 different items for recommendation), and all user profile information and user interaction information for each of the content types is known, two-phase model builder 110 may generate a recommendation model capable of identifying an enhanced content recommendation based on inputted vectors that may outperform other single recommendation algorithms, resulting in an increased likelihood of user engagement.

Figure 2:
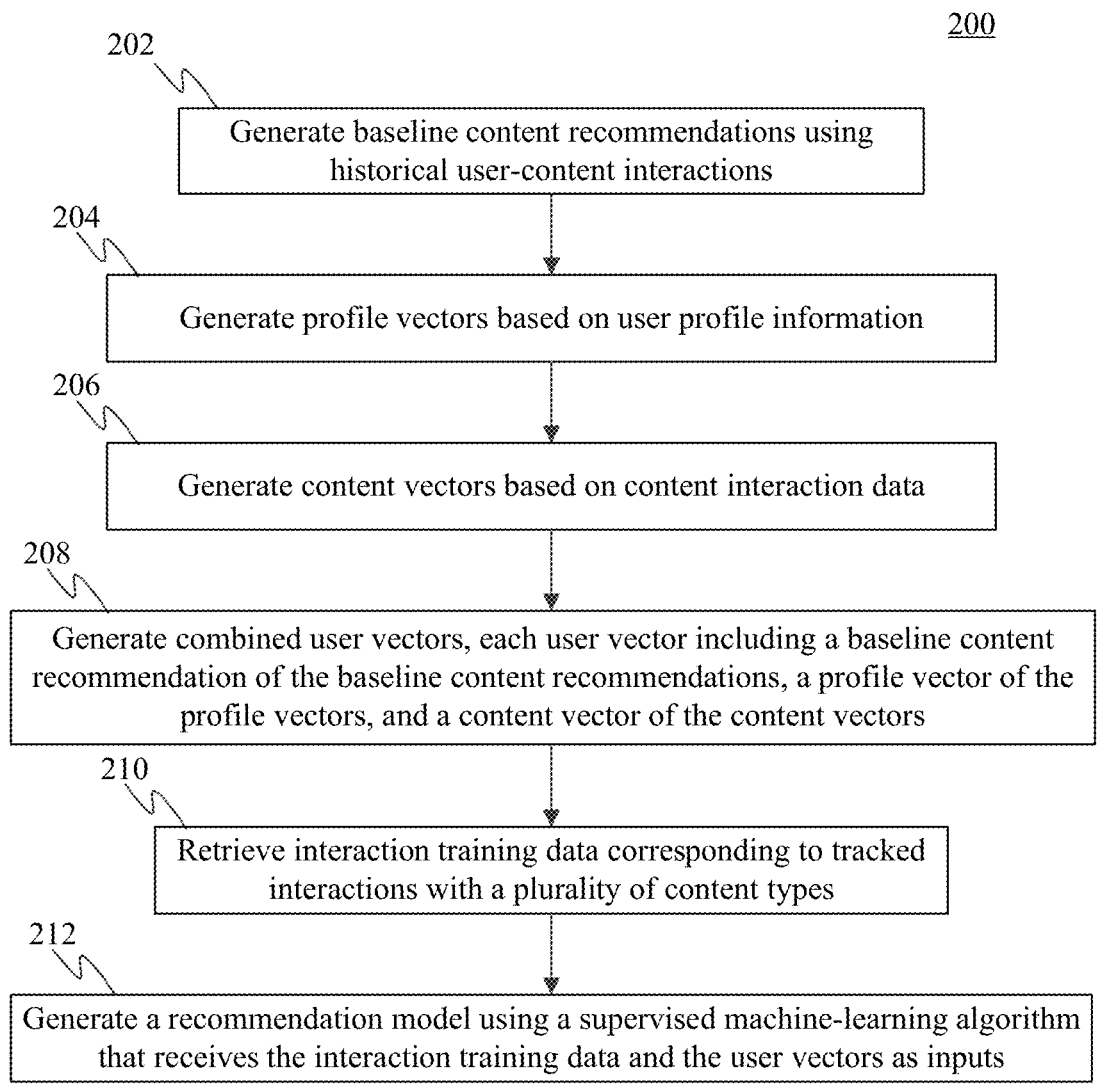
FIG. 2 shows a flowchart of a method for generating a recommendation model using a two-phase technique, according to an example embodiment.
Figure 3:
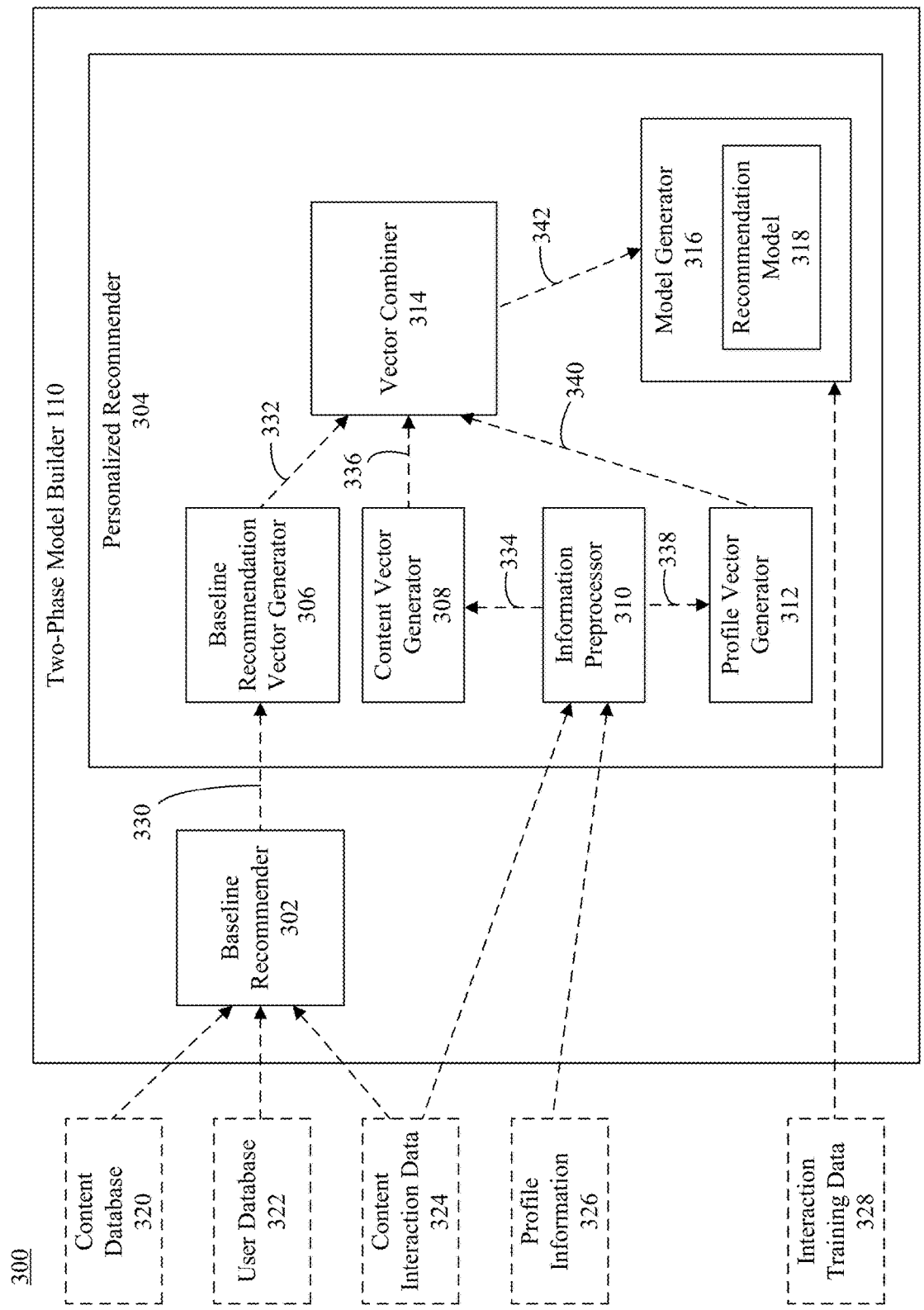
FIG. 3 shows a block diagram of a two-phase model builder, according to an example embodiment.

Two-phase model builder 110 may operate in various ways to generate a recommendation model. For instance, two-phase model builder 110 may operate according to FIG. 2. FIG. 2 shows a flowchart 200 of a method for generating a recommendation model using a two-phase technique, according to an example embodiment. Flowchart 200 and two-phase model builder 110 are described as follows with respect to FIG. 3. FIG. 3 shows a block diagram of an enhanced recommendation system 300, according to an example embodiment. As shown in FIG. 3, system 300 comprises two-phase model builder 110. Two-phase model builder 110 includes a baseline recommender 302 and a personalized recommender 304. Personalized recommender 304 includes a baseline recommendation vector generator 306, an information preprocessor 310, a content vector generator 308, a profile vector generator 312, a vector combiner 314, and a model generator 316. As shown in FIG. 3, a content database 320, a user database 322, and content interaction data 324 may be inputs to baseline recommender 302. Furthermore, content interaction data 324 and profile information 326 may be inputs to information processor 310. Model generator 316 may be configured to generate and train a recommendation model 318 using combined user vectors from vector combiner 314 and interaction training data 328 corresponding to tracked user interactions.

Flowchart 200 of FIG. 2 begins with step 202. In step 202, a baseline content recommendation is generated using historical user-content interactions. For instance, with reference to FIG. 3, baseline recommender 302 is configured to generate a baseline content recommendation 330 using, among other things, content interaction data 324. Content interaction data 324 may comprise a repository or log of historical user-content interactions. Content interaction data 324, for example, may include an array or matrix identifying previous user interactions of a plurality of users (e.g., user 1, user 2, . . . , user n) with one or more content types (e.g., content type 1, content type 2, . . . , content type m) mentioned elsewhere herein or otherwise known.

In some examples, baseline recommender 302 may also receive, as inputs, information from content database 320 and user database 322. Content database 322 may identify content available for recommendation to one or more users (e.g., real-time content such as active gameplay, or stored content such as screenshots). Content database 322 may identify the available types of content based on a content identifier (ID). User database 322 may identify the set of users for which baseline content recommendations are to be generated. User database 322 may comprise a subscriber list or users of a particular game(s) or gaming console(s). In some implementations, user database 322 may similarly identify users via a user ID (e.g., a numerical id, an alias, a user name, an email address, a gamer tag, etc.).

Content interaction data 324 may identify such interactions in any manner, including by a binary identifier that indicates whether each user has interacted with each of the content types (e.g., a flag, a true/false indicator, etc.). In other implementations, content interaction data 324 may identify such user-content interactions with an indicator that identifies an amount of interaction with the content of the plurality of content types. For example, content interaction data 324 may include a click-through rate (CTR), or other measure representing a rate, frequency, etc. of how often each user accesses each type of content. Implementations described herein are not intended to be limiting and may include a combination of a binary indicator and an indicator identifying an amount of interaction, or any other manner of tracking historical user interactions for a plurality of users across a plurality of content types.

As illustrative examples, content interaction data 324 may indicate, for each user and content type, a history of interaction based on whether the user has clicked on the particular type of content, a number of user clicks on the type of content, a mouse hover over the type of content, purchase behavior regarding the content, or any other type of interaction, potential interaction, or other browsing/interaction behavior with each of the plurality of content types described herein. It is noted that although certain interactions are described herein based on a particular user's click activity, implementations are not limited to clicks via a mouse or the like, but may include any other manner of selecting a particular item of content for viewing, accessing, such as via a touch screen interaction, a voice-based interaction, a joystick or game controller interaction, a stylus or pen-based interaction, etc.

In some instances, baseline recommender 302 may be configured to aggregate information contained within content interaction data 324 into one or more time periods prior to generating baseline content recommendations 330. For example, baseline recommender 302 may aggregate user event records to generate an aggregated set of interaction data representing a duration that a particular user played a multiplayer game (or interacted with any other content) in a predetermined time period. Such aggregation is not limited to aggregating a duration for a particular type of game played, but may include any other type of aggregation, statistical analyses, and/or processing of content interaction data 324 for the plurality of users and content types. In some other instances, however, baseline content recommender 302 may aggregate content interaction data 324 over a single time period (e.g., the past year or the like). In some other examples, baseline recommender 302 may aggregate the number of hours a user played multiplayer games in the past 7 days, 30 days, 90 days, etc. In another illustrative example, baseline recommender 302 may implement one or more time offsets when aggregating information, enabling baseline recommender 302 to aggregate information over a particular period of time, such as particular day(s), week(s), month(s), etc. or using a rolling time window. For example, information may be aggregated over a first week using no offset (e.g., days 1 to 7), a second week using a 7-day offset (e.g., days 8 to 14), and so on.

In implementations, baseline content recommendations 330 may similarly comprise a matrix or array of users x content types. For example, a matrix outputted by baseline recommender 302 may indicate, for each user (or user ID) one or more content types for which the user is most likely to interact with based on content interaction data 324. In some instances, baseline content recommendations 330 may include a ranked set of content recommendations for each user (e.g., most likely, next most likely, etc.). A ranking of content recommendations for each user may comprise a predetermined number of recommendations of content types, may comprise a ranking of all of the content types (ranging from most likely to least likely to be of interest to the user), or may comprise a number of ranked results determined by baseline recommender 302, such as where baseline recommender 302 may output a recommendation where a score or confidence value exceeds a threshold. In implementations, baseline content recommendations 330 may identify such recommendations in any suitable manner, including by identifying a number value indicating a ranking, a probability representing a likelihood of interaction, and/or a flag or the like indicating a particular content type that is most likely to be accessed.

Baseline recommender 302 may generate baseline content recommendations 330 in any one or more ways, including by implementing a heuristic model, a frequency model, a duration model, a recency model, a SAR model, an FM or MF model, a collaborative filtering model, a factorization machine model or any other suitable model including but not limited to machine-learning models. In some implementations, one or more models implemented by baseline recommender 302 to generate baseline content recommendations 330 may be trained using a supervised and/or an unsupervised machine-learning algorithm.

It is noted and appreciated that baseline recommender 302 is not limited to generating baseline content recommendations 330 using the illustrative techniques described herein but may include any other manner of generating a content recommendation presently known and/or developed in the future. In some other example embodiments, baseline recommender 302 may be configured to implement a plurality of recommendation models, where each model is configured to generate baseline content recommendations for each user using content interaction data 324. In this manner, baseline content recommendations 330 may include content recommendations for each user using each of the implemented recommendation models.

In some implementations, baseline recommendation vector generator 306 may be configured to generate baseline content recommendation vectors 332 based on baseline content recommendations 330. For instance, baseline recommendation vector generator 306 may generate a baseline content recommendation vector for each of the plurality of users corresponding to the user's baseline content recommendation. In some examples, baseline recommendation vector generator 306 may generate baseline content recommendation vectors 332 based on a ranked set of baseline content recommendations 330 for the plurality of users. In some other examples, such as where baseline recommender 302 implements a plurality of recommendation models and outputs a plurality of baseline content recommendations for each user corresponding to each recommendation model, baseline recommendation vector generator 306 may generate separate baseline content recommendation vectors corresponding to each model. Baseline recommendation vector generator 306 may be configured to combine such vectors for each user prior to transmitting baseline content recommendation vectors 332 to vector combiner 314 (as described later) or may transmit a plurality of vectors (e.g., corresponding to each recommendation model) to vector combiner 314.

Referring back to FIG. 2, in step 204, profile vectors are generated corresponding to the users based on user profile information of the users. For instance, with reference to FIG. 3, profile vector generator 312 of personalized recommender 304 may be configured to generate profile vectors 340 for each of the plurality of users (e.g., user 1, user 2, . . . , user n) based on profile information 326 of the users. In some example implementations, the users for which profile vectors 340 are generated comprises the same set of users obtained from user database 322 and utilized by baseline recommender 302 in generating baseline content recommendations 330.

As shown in FIG. 3, information preprocessor 310 may be configured to receive profile information 326 corresponding to the users. Profile information 326 may comprise any information or data corresponding to a profile or other general behavioral or usage-related information of a user. For instance, profile information 326 may comprise behavioral information relating to a user that is not specific to the user's interaction with a particular game or content. In some examples, profile information 326 may include account features, such as a device type(s) of the user, an account type, an account creation date, subscription or membership information (e.g., an identification of one or more subscriptions or memberships, how long each one has been active, a payment amount or history associated with each subscription or membership, an automatic renewal status), etc. Profile information 326 may also include other types of user profile information, such as demographic information (e.g., age, location, language, etc.).

In yet other examples, profile information 326 may comprise social information of the user (e.g., a social graph or the like), such as a network of games or other content associated with the user, a network of other users or friends (including whether each such other user was added to a network by searching for the user, in connection with a gameplay, etc.), information relating to whether a user follows other users (and the identify thereof), whether the user has shared their real identity, a number and/or identity of friends added or removed, or any other information relating to how the user interacts with other users of a common ecosystem.

Profile information 326 may also comprise other user behavioral or profile information relating to a user, such as an overall time spent online, or time spent playing or viewing certain content types (or clusters/categories of content types) such as multiplayer games, a number of multiplayer game invitations sent or received by the user, a number of multiplayer game sessions initiated or attended by the user, a number of looking for group (LFG) instances that the user created, joined or confirmed, a number of times and/or a time of day the user has powered on or logged onto computing device 102, media consumption and/or media generation of the user (e.g., screenshots, short clips, etc.), a duration and/or popularity of a user's generated media, the last time the user published an item of media, actions taken on an item of media, language used in an item of media, a number of text and/or voice chats initiated or attended by the user during a game session, achievements or milestones of the user, whether and how the user has shared such achievements, purchase behavior of the user, etc. Such examples of profile information are provided for illustrative purposes, and it is to be understood that embodiments are applicable to any other further suitable type of profile information.

Profile vector generator 312 may generate, for each user, a vector representing the user's profile information. Profile vector generator 312 may generate profile vectors 340 in various ways. For example, profile vector generator 312 may generate such vectors based one or more information preprocessing techniques performed by information preprocessor 310. Information preprocessor 310 may be configured to retrieve profile information 326 in a raw or unprocessed format and perform one or more processing steps to rearrange, reformat, or aggregate such information to generated preprocessed profile information 338 for profile vector generator 312. For instance, information preprocessor 310 may be configured to perform one or more aggregation techniques to aggregate profile information 326 across a plurality of various time periods or windows (e.g., the past 7 days, 30 days, 90 days, etc.). Information preprocessor 310 may also be configured to aggregate profile information using one or more time offsets in a similar manner as described earlier, such as by aggregating information over a first week, a second week, and so on. Such aggregation performed by information preprocessor 310 may encompass any other type of aggregation, statistical analyses, and/or processing of profile information 326.

It is noted that while similar aggregation techniques may be carried out by information preprocessor 310 as described previously (e.g., with respect to baseline recommender 302), aggregation techniques carried out by information preprocessor 310 may be performed with greater granularity. For instance, while baseline content recommender 302 may aggregate content interaction data 324 over a single time period (e.g., the past year), information preprocessor 310 may be configured to aggregate profile information 326 over a plurality of time periods. Such additional aggregation may enable profile vector generator 312 to generate profile vectors with additional detail, thereby further enhancing recommendation model 318 as will be described in greater detail below.

Referring back to FIG. 2, in step 206, content vectors corresponding to the users are generated based on content interaction data of the users. For instance, with reference to FIG. 3, content vector generator 308 may be configured to generate content vectors 336 based on content interaction data 324. In implementations, content vector generator 308 may generate content vectors 336 that comprise a single content vector for each of the users (e.g., users identified in user database 322) based on the users' respective content interaction data 324. As described above, content interaction data 324 may comprise content interaction information of each of a plurality of users (e.g., users identified in user database 322). Content interaction data 324 may comprise one or more content interaction or behavior logs, or other log(s) of information that may store tracked user interactions on computing device 102 with respect to a plurality of content types.

Content interaction data 324 may include, for example, historical click-related information for each of the users. For instance, for each user, click patterns may be calculated for a particular time period (e.g., one year ago to seven days ago), which may indicate the most recent content that user has clicked or accessed in the time period, the most frequent content that the user has clicked or accessed in that period, etc. Click-related information may also include a ranking based on frequency per user and per content type, a ranking based on a recency per user and per content type, the likes/and/or dislikes of a user (e.g., based on explicit user signals) with respect to content types, etc.

Therefore, in accordance with example embodiments, content vector generator 308 may generate, for each user, a content vector representing the user's interaction history. Content vector generator 308 may generate content vectors 336 in a variety of ways. For instance, as shown in FIG. 3, content vector generator 308 may obtain content interaction information 324 after one or more preprocessing operations performed by information preprocessor 310. Information preprocessor 310 may aggregate or otherwise preprocess content interaction information 324 in a raw or unprocessed format to generate preprocessed content interaction data 334 in a similar manner as described above with respect to step 204. As an example, information preprocessor 310 may aggregate content interaction information 324 over a plurality of time periods, such that the aggregation of content interaction data 324 utilized by content vector generator 308 is at a different and/or higher relative level of granularity than aggregated information utilized by baseline recommender 302. For example, interaction logs or user event records may be aggregated based on a duration of interacting with a particular type of content, a number of sessions in a given time period, a number of times a user has accessed or viewed certain content types, or any other aggregation of user interaction logs. As an illustrative example, information preprocessor 310 may be configured to aggregate the number of minutes or hours a user played one or more video games or otherwise interacted with other content in the past 3 days, 7 days, 30 days, 90 days, etc. In some example embodiments, content vector generator 308 (as well as profile vector generator 312 discussed above) may also be configured to use one or more weighting factors and/or exponential decay factors configured to give more weight to recent events and/or less weight to older events when generating content vectors 336 (or profile vectors 340).

Referring back to FIG. 2, in step 208, combined user vectors are generated, each combined user vector including a baseline recommendation of the baseline content recommendations, a profile vector of the profile vectors, and a content vector of the content vectors. For instance, with reference to FIG. 3, vector combiner 314 may be configured to combine a profile vector of profile vectors 340, a content vector of content vector 336, and a baseline content recommendation of baseline content recommendations 330. In implementations, each combined user vector comprises the respective baseline content recommendation, profile vector, and content vector of that user to generate a single combined user vector for that user. Vector combiner 314 may therefore combine, for each of the plurality of users, the user's respective vectors to generate a plurality of combined user vectors 342.

Vector combiner 314 may combine, for each user, the received baseline content recommendation vector, the content vector, and the profile vector in any suitable manner, including but not limited to concatenation, stacking, merging, or any other known manner of combining a plurality of vectors into a single combined vector. Accordingly, vector combiner 314 may generate, for each user, a single user vector that includes a baseline content recommendation of baseline content recommendations 330, a profile vector of the profile vectors 340, and a content vector of the content vectors 336 corresponding to the user. In this manner, each user's individual usage patterns may be represented by a single combined user vector.

Note that in an embodiment, vector combiner 314 may not be present, and instead each baseline content recommendation vector, content vector, and profile vector corresponding to a user may be combine into a combined vector by being stored in a database or other data structure in association with each other.

Referring back to FIG. 2, in step 210, interaction training data corresponding to tracked interactions with content of a plurality of content types may be retrieved. For instance, with respect to FIG. 3, model generator 316 may retrieve interaction training data 328 that includes a history of tracked interactions, by the plurality of users, with content of the plurality of content types. Interaction training data 328 may include user interaction behavior for each of the plurality of users. In some implementations, the interaction training data 328 may include such interaction behavior during a particular training period. For instance, interaction training data 328 may comprise tracked user interactions with content of the plurality of content types over the past predetermined number of days (e.g., the past 7 days) or any other time period that may be representative of a user's recent behavioral patterns.

In example embodiments, interaction training data 328 may comprise a matrix or array of tracked user interactions and content types. As will described in greater detail below, interaction training data 328 may serve as training data in generating a recommendation model. Accordingly, content for which interactions are tracked may correspond to the targets or labels to be predicted by the recommendation model. Where interaction training data 328 comprises a user-content interaction matrix, for instance, the targets or labels may comprise the same user IDs and content IDs utilized by baseline recommender 302.

In examples, interaction training data 328 may indicate, for each user, whether the user clicked (or otherwise interacted with) content of the plurality of content types during the training period. In other examples, interaction training data 328 may indicate, for each of the users, a CTR indicating tracked interactions of the user with content for each of the content types. Implementations are not limited to these illustrative examples, but may include a combination thereof, or tracking user interactions with content in any other manner that will be appreciated to those skilled in the relevant art. As an illustrative example, interaction training data 328 may indicate for a particular user (e.g., with one of the user IDs discussed herein) that the user clicked on one or more items of content (e.g., accessed a screenshot or a video clip relating to a particular game title). Embodiments are not limited to tracking click information but may also include any other objective function.

Referring back to FIG. 2, in step 212, a recommendation model is generated using a supervised machine-learning algorithm that receives the interaction training data and user vectors as inputs. For instance, with continued reference to FIG. 3, model generator 316 is configured to generate recommendation model 318 using a supervised machine-learning algorithm. Model generator 316 may receive, as inputs, the user vectors generated by vector combiner 314 corresponding to each of the users along with interaction training data 328 identifying each user's tracked interactions.

In implementations, model generator 316 may therefore implement a supervised machine-learning algorithm to analyze combined user vectors 342 to determine one or more content recommendations in generating recommendation model 318. Such content recommendations may be compared with actual interaction behavior (e.g., interaction training data 328) to train (or retrain) recommendation model 318. In this manner, because model generator 318 may train recommendation model 318 using actual interaction behavior, such as real-world click behavior of each of the users, recommendation model 318 may predict a particular user's interaction with one or more content types based on the user's prior interactions.

In accordance with implementations, model generator 316 may generate recommendation model 318 in various ways, including but not limited to any suitable supervised machine-learning algorithm. For instance, a supervised machine learning algorithm may be selected based on the most suitable algorithm that matches features of the vectors to the target labels. For instance, model generator 316 may implement a gradient boosted tree algorithm or other decision tree algorithm to generate and/or train recommendation model 318 because such algorithms may be robust to feature collinearity. Such example algorithms may enable the determination of a feature (or features) that is highly correlated with a particular label (or content ID). Upon selecting the feature(s) that is highly correlated with label, the next highly correlated feature with the label may be identified. This process may be repeated for all features in combined user vectors and for all targets or labels to generate a decision tree that may be utilized to train recommendation model 318. In some examples, the supervised machine learning algorithm may be further configured to implement one or more regularization techniques to reduce the potential risk of overfitting due to noise in the input data It is noted that a decision tree-based algorithm need not be based solely on each individual user's combined vector, but may train recommendation model 318 based on all combined user vectors. In other woods, such a supervised learning algorithm may determine behavioral patterns across the plurality of users to identify which features may be correlated with certain labels or tracked user interactions. In this manner, recommendation model 318 may be generated that may be utilized for a plurality of users, while also taking into account each user's individual behavioral patterns. As a result, a particular user vector may be applied to the model to identify content for recommendation.

Figure 4:
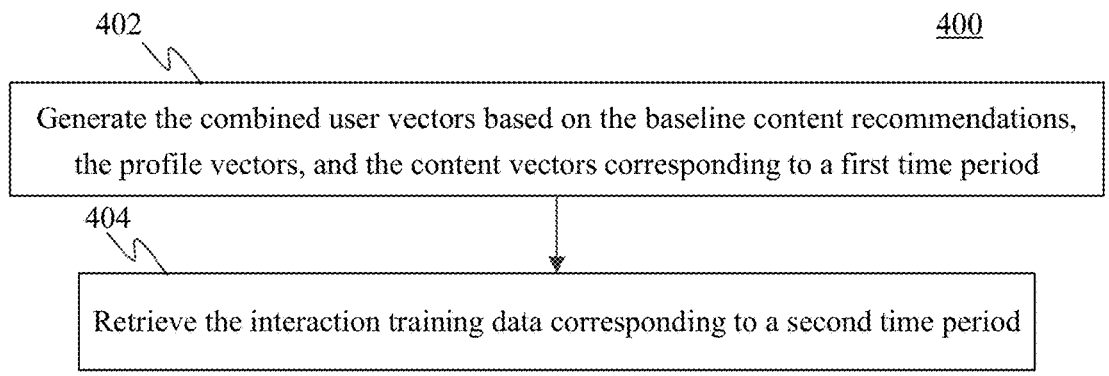
FIG. 4 shows a flowchart of a method for generating user vectors and retrieving interaction training data for different time periods, according to an example embodiment.

In implementations, vector combiner 314 may generate combined user vectors during a time period that is different than the time period for which interaction training data 328 is retrieved. For example, FIG. 4 shows a flowchart 400 of a method for generating user vectors and retrieving interaction training data for different time periods, according to an example embodiment. In an implementation, the method of flowchart 400 may be implemented by vector combiner 314 and model generator 316. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, combined user vectors based on the baseline content recommendations, the profile vectors, and the content vectors are generated corresponding to a first time period. For instance, with reference to FIG. 3, vector combiner 314 may be configured to generate combined user vectors 342 based on baseline content recommendations 330, profile vectors 340, and content vectors 336 corresponding to a first time period. The first time period may be any time period in which baseline content recommendations 330, profile vectors 340, and content vectors 336 may be generated such that model generator 316 may be able to make sufficient correlations between features of the combined vectors and target labels. In one illustrative example, the time period may be the last one year minus the most recent week (i.e., 51 weeks of information offset by 7 days). In such an example, baseline recommender 302 may retrieve content interaction data 324 corresponding to the time period of one year minus the most recent week. Similarly, content vector generator 308 may retrieve content interaction data 324, and profile vector generator may retrieve profile information 326 (after appropriate preprocessing techniques are performed, as described herein) corresponding to the same time period. As a result, baseline content recommendations 330, profile vectors 340, and content vectors 336 may all be generated corresponding to the time period of one year minus the most recent week.

Therefore, vector combiner 314 may generate combined user vectors 342 corresponding to the same time period as the data from which baseline content recommendations 330, profile vectors 340, and content vectors 336 are generated, enabling model generator 316 to ingest user vectors 342 corresponding to this same time period.

In step 404, interaction training data corresponding to a second time period is obtained. For instance, with reference to FIG. 3, model generator 316 may retrieve interaction training data 328 corresponding to a second time period. In implementations, the second time period may be shorter than the first time period. In further implementations, the second time period may be significantly shorter than the first time period (e.g., the second time period may be the most recent week, while the first time period may be one year minus the most recent week). In some other example embodiments, the first time period and the second time period are non-overlapping time periods. As a result, training data, such as click information corresponding to tracked interactions, used to train recommendation model 318 may correspond to a different time period than the vectors used to generate the model. Implementations, however, are not limited to non-overlapping time periods, and may include overlapping time periods as well.

Figure 5:
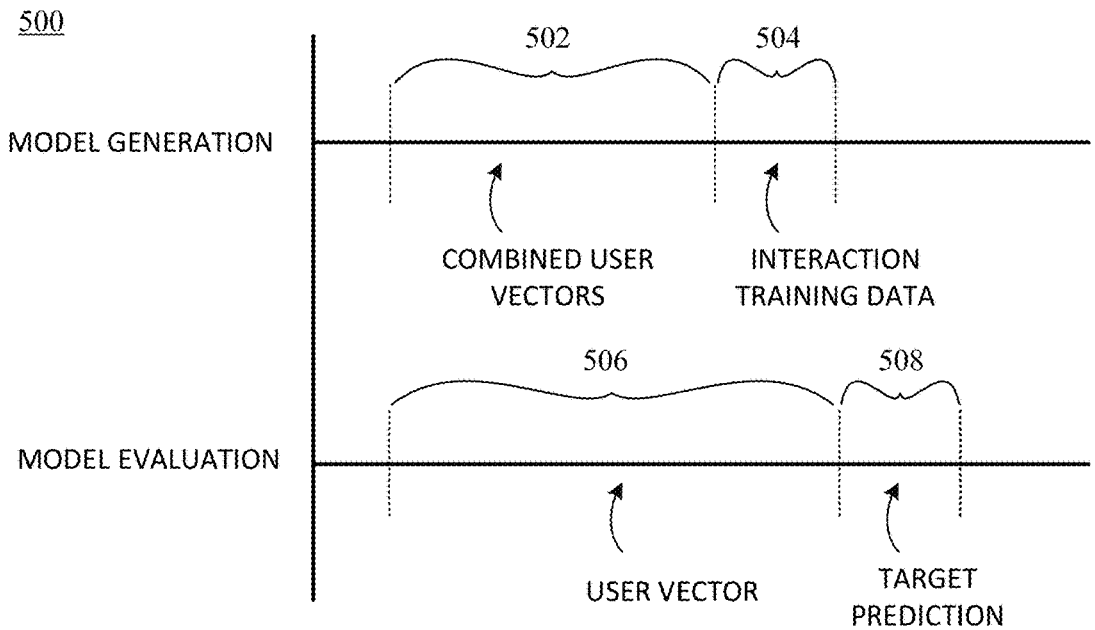
FIG. 5 shows a timing diagram of data related to a two-phase model builder, according to an example embodiment.

Accordingly, in example embodiments, model generator 316 may be configured to retrieve a vector stream to generate recommendation model 318 based on a relatively longer durational stream of content interaction data 324 and profile information 326, while retrieving tracked interactions corresponding to training data for a relatively shorter, and more recent, time period to train recommendation model 318. FIG. 5 shows an illustrative timing diagram 500 depicting such an example. Timing diagram 500 shows an example timing between various points during a model generation and a model evaluation phase, described in greater detail below. For instance, during the model generation phase as shown in FIG. 5, combined user vectors 342 may be generated based on baseline content recommendations, profile vectors, and content vectors corresponding a first time period 502, model generator 316 may retrieve interaction training data 328 corresponding to a second time period 504. As shown in the non-limiting diagram of FIG. 5, first time period 502 is non-overlapping and relatively longer than second time period 504. As a result, model generator 316 may be configured to generate and train recommendation model 318 based on relatively recent tracked interactions (occurring during second time period 504), while also leveraging behavioral patterns over a longer period of time (occurring during first time period 502).

Figure 6:
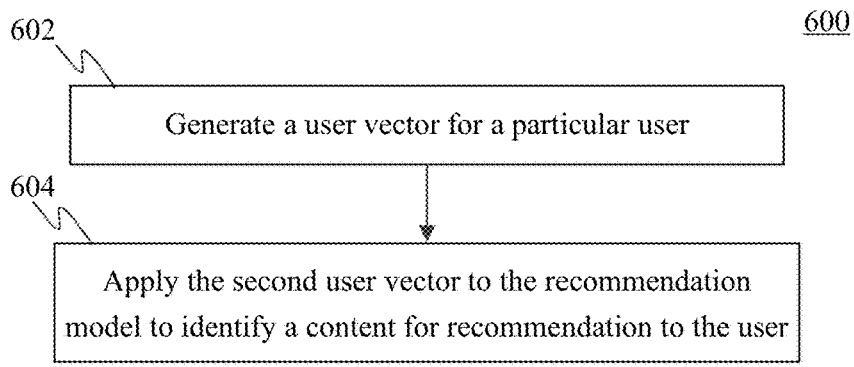
FIG. 6 shows a flowchart of a method for providing an enhanced content recommendation to a computing device, according to an example embodiment.

As described above, recommendation model 318, when evaluated, may identify a content item for recommendation. For example, FIG. 6 shows a flowchart 600 of a method for providing an enhanced content recommendation to a computing device, according to an example embodiment. In an implementation, the method of flowchart 600 may be implemented by enhanced content recommendation engine 108 and recommendation model 318. FIG. 6 is described with continued reference to FIGS. 3 and 5. Other structural and operational implementations will be apparent to persons skilled in the relevant art(s) based on the following discussion regarding flowchart 600, system 300 of FIG. 3, and timing diagram 500 of FIG. 5.

Flowchart 600 begins with step 602. In step 602, a user vector corresponding to a third time period is generated for a particular user. For example, with reference to FIG. 1, computing device 102 may transmit request 114 to server 104 to request content recommendations. Request 114 may be transmitted by computing device 102 in various ways. For instance, request 114 may be transmitted in response to a request for recommended content initiated by a user of computing device 102 via interaction with an interactive interface control. In another implementation, request 114 may be transmitted based on a user navigation within one or more graphical user interface (GUI) screens. In some examples, request 114 may be generated based on a user navigation to a home screen, a menu screen, a guide screen, a game hub (e.g., a page dedicated to a particular title), an attract mode screen (e.g., a screen displayed during an idle or time-out state of one of computing devices 102 that may comprise content recommendations 126), or a content store interface where content may be accessed, purchased, downloaded, etc. In yet other examples, request 114 may be generated automatically upon powering on computing device 102 such that one or more content recommendations may be displayed on a home screen.

Enhanced content recommendation engine 108 of server 104 may receive request 114 and initiate an identification of a generating a content recommendation for the particular user for which the request pertains (i.e., the user of computing device 102). In examples, enhanced content recommendation engine 108, upon receiving request 114, may cause vector combiner 314 to generate a user vector for the particular user for which the request pertains (i.e., a user of computing device 102) corresponding to a third time period. Vector combiner 314 may generate a combined user vector in a similar manner as described herein. For example, baseline recommender 302 may obtain content interaction data 324 corresponding to the third time period to generate one or more baseline content recommendations (or ranked set of recommendations) for the particular user, and baseline recommendation vector generator 306 may generate a baseline recommendation vector based on the baseline content recommendations. Similarly, profile vector generator 312 may obtain profile information 326 (after one or more preprocessing techniques may be performed) corresponding to the third time period to generate a profile vector for the particular user. Furthermore, content vector generator 308 may generate, for the particular user, a content vector based on content interaction data 324 corresponding to the third time period. Vector combiner 314 may combine each such vector to generate a user vector for the particular user corresponding to the third time period.

The third time period may comprise a time period over which the combined user vector for the particular user sufficiently describes the user's behavioral habits such that an accurate content recommendation may be generated. In some example embodiments, the third time period may be similar to the first time period, though the third time period may cover a different (e.g., greater or lesser) duration. For instance, where the first time period described herein is one year minus the most recent week (e.g., an overall duration of 51 weeks), the third time period may comprise a duration of one year (e.g., the past 52 weeks). It is noted that examples are not limited to these illustrative time periods, but other time periods appreciated to those skilled in the art are also within the scope of the invention.

In step 604, the second user vector is applied to the recommendation model to identify content for recommendation to the particular user. For example, with reference to FIG. 3, the second user vector may be applied to recommendation model 318 generated and trained previously to identify content for recommendation to the particular user. In example embodiments, the second user vector may be applied to the model to identify one or more items of content that are most likely to be accessed (e.g., clicked) by the particular user based on the user's behavioral patterns.

Because recommendation model 318 may be generated in a generic manner (i.e., the model is applicable to a plurality of users), the particular user need not be a member of the set of users that was used to generate recommendation model 318. For instance, a combined user vector of the particular user may be generated in a manner as described above, and applied to the model to identify a content recommendation in such instances. For example, where recommendation model 318 was generated and trained based on a decision tree, features of the particular user's combined user vector may be used to navigate through the tree to determine the item(s) of content for which the user is most likely to click or access. When a particular user vector is applied to recommendation model 318, enhanced content recommendation engine 108 may identify content recommendation 116 determined by the model and transmit content recommendation 116 to computing device 102 for display on display screen 104.

The timing diagram of FIG. 5 depicts an illustrative timing relationship during a model generation and model evaluation stage. For instance, as described previously, combined user vectors 342 may be generated during first time period 502 that is longer than time period 504 for which training data is obtained during the model generation stage. During the model evaluation stage (e.g., to identify content to recommend), the user vector may be generated for a third time period 506 that may overlap with first time period 502 and/or second time period 504. The user vector may be applied to recommendation model 318 during a fourth time period 508, or a target prediction stage. For instance, fourth time period may comprise a duration of one week, though example embodiments are not limited to this particular time period. As a result, the user vector for a particular user may be applied to recommendation model 318 to identify content recommendations for a time period encompassing the next week in such an example (or any other period of time).

Although it has been described herein that enhanced content recommendation engine 108 may initiate the determination of a content recommendation upon receiving request 114, it is understood that one or more steps may be performed in an offline manner to further reduce the delay or latency for enabling enhanced content recommendation engine 108 to transmit content recommendation 116 to computing device 102. For instance, vector combiner 314 may be configured to generate combined user vectors corresponding to the third time period automatically (e.g., at predetermined times or intervals) for each user for which content recommendations may be generated. In such instances, vector combiner 314 may store combined vectors for each user in a repository based on a user ID or other identifier. Upon receiving request 114 for a content recommendation, which may contain a user ID associated with the request, enhanced content recommendation engine 108 may access the stored user vector corresponding to the user ID and apply the user vector to recommendation model 318 to identify one or more items of content to recommend to the user.

In some other examples, to even further reduce response latency, each combined user vector that was generated corresponding to the third time period may be applied to recommendation model 318 in an offline manner (i.e., not in response to request 114) to identify one or more items of content to recommend to the user. Such recommendations may be similarly stored in a repository coupled to server 104 based on a user ID. Upon receiving request 114 from computing device 102 which contains a user ID, enhanced content recommendation engine 108 may retrieve the previously identified content recommendation from the repository based on the obtained user ID and transmit the recommendation to computing device 102. As a result, enhanced content recommendation engine 108 may further reduce the delay in identifying and transmitting recommended content to computing device 102.

III. Example Mobile and Stationary Device Embodiments

Computing device 102, server 104, two-phase content recommendation system 106, enhanced content recommendation engine 108, two-phase model builder 110, baseline recommender 302, personalized recommender 304, flowchart 200, flowchart 400, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, server 104, two-phase content recommendation system 106, enhanced content recommendation engine 108, two-phase model builder 110, baseline recommender 302, personalized recommender 304, flowchart 200, flowchart 400, and/or flowchart 600 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
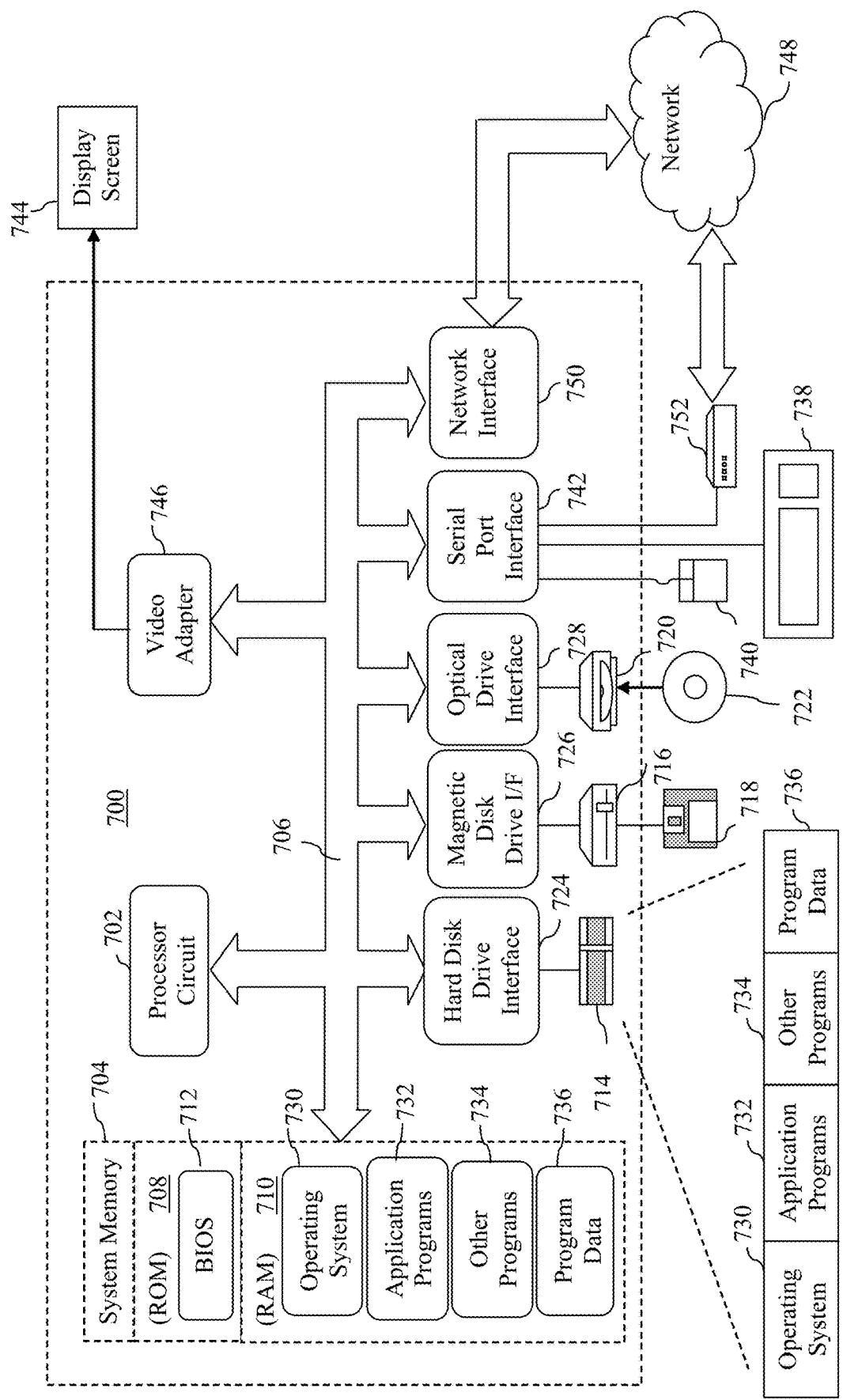
FIG. 7 shows a block diagram of an example computing device that may be used to implement example embodiments.

FIG. 7 depicts an exemplary implementation of a computing device 700 in which embodiments may be implemented. For example, any of computing device 102, server 104, two-phase content recommendation system 106, enhanced content recommendation engine 108, two-phase model builder 110, baseline recommender 302, or personalized recommender 304 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing computing device 102, server 104, two-phase content recommendation system 106, enhanced content recommendation engine 108, two-phase model builder 110, baseline recommender 302, personalized recommender 304, flowchart 200, flowchart 400, and/or flowchart 600 (including any suitable step of flowcharts 200, 400, or 600) and/or further embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments described herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for generating a machine-learning model for providing a content recommendation is closed herein. The system includes: at least one processor; and memory that stores program code configured to be executed by the at least one processor, the program code comprising: a baseline recommender configured to generate baseline content recommendations using historical user-content interactions by a plurality of users; a personalized recommender comprising: a profile vector generator configured to generate profile vectors corresponding to the users based on user profile information of the users; a content vector generator configured to generate content vectors corresponding to the users based on content interaction data of the users; a vector combiner configured to generate user vectors for the users, each user vector generated for a user including a baseline content recommendation of the baseline content recommendations, a profile vector of the profile vectors, and a content vector of the content vectors corresponding to the user; and a model generator configured to: retrieve interaction training data corresponding to tracked interactions, by the users, with content of a plurality of content types; and generate a recommendation model using a supervised machine-learning algorithm that receives the interaction training data and user vectors as inputs, the recommendation model configured to identify content for recommendation to users.

In one implementation of the foregoing system, the content interaction data indicates, for each of the users, an amount of interaction with content of the content types on a video game console.

In another implementation of the foregoing system, the vector combiner is configured to generate the user vectors based on the baseline content recommendations, the profile vectors, and the content vectors corresponding to a first time period, and the model generator is configured to retrieve the interaction training data corresponding to a second time period shorter than the first time period.

In another implementation of the foregoing system, the vector combiner is configured to generate a second user vector corresponding to a third time period for a particular user; and the system further comprises: an enhanced content recommendation engine configured to apply the second user vector to the recommendation model to identify content for recommendation to the particular user.

In another implementation of the foregoing system, the interaction training data comprises, for each of the users, a click-through rate indicating tracked interactions of the user with content for each of the content types.

In another implementation of the foregoing system, the baseline content recommendations comprise a ranking of baseline content recommendations for each of the users.

In another implementation of the foregoing system, the baseline recommender comprises a plurality of recommendation models, each recommendation model configured to generate baseline content recommendations using historical user-content interactions by the users.

A method in a computing device for generating a machine-learning model for providing a content recommendation is disclosed. The method includes: generating baseline content recommendations using historical user-content interactions by a plurality of users; generating profile vectors corresponding to the users based on user profile information of the users; generating content vectors corresponding to the users based on content interaction data of the users; generating combined user vectors for the users, each user vector generated for a user including a baseline content recommendation of the baseline content recommendations, a profile vector of the profile vectors, and a content vector of the content vectors corresponding to the user; retrieving interaction training data corresponding to tracked interactions, by the users, with content of a plurality of content types; and generating a recommendation model using a supervised machine-learning algorithm that receives the interaction training data and user vectors as inputs, the recommendation model configured to identify content for recommendation to users.

In one implementation of the foregoing method, the content interaction data indicates, for each of the users, an amount of interaction with content of the content types on a video game console.

In another implementation of the foregoing method, the generating the combined user vectors comprises generating the combined user vectors based on the baseline content recommendations, the profile vectors, and the content vectors corresponding to a first time period, and the retrieving the interaction training data comprises retrieving the interaction training data corresponding to a second time period shorter than the first time period.

In another implementation of the foregoing method, the method further includes: generating a second user vector corresponding to a third time period for a particular user; and applying the second user vector to the recommendation model to identify content for recommendation to the particular user.

In another implementation of the foregoing method, the interaction training data comprises, for each of the users, a click-through rate indicating tracked interactions of the user with content for each of the content types.

In another implementation of the foregoing method, the baseline content recommendations comprise a ranking of baseline content recommendations for each of the users.

In another implementation of the foregoing method, the generating the baseline content recommendation comprises generating the baseline content recommendations using historical user-content interactions by the users for each of a plurality of recommendation models.

A computer-readable memory is disclosed herein. The computer-readable memory includes computer program code recorded thereon that when executed by at least one processor causes the at least one processor to perform a method comprising: generating baseline content recommendations using historic al user-content interactions by a plurality of users; generating profile vectors corresponding to the users based on user profile information of the users; generating content vectors corresponding to the users based on content interaction data of the users; generating combined user vectors for the users, each user vector generated for a user including a baseline content recommendation of the baseline content recommendations, a profile vector of the profile vectors, and a content vector of the content vectors corresponding to the user; retrieving interaction training data corresponding to tracked interactions, by the users, with content of a plurality of content types; and generating a recommendation model using a supervised machine-learning algorithm that receives the interaction training data and user vectors as inputs, the recommendation model configured to identify content for recommendation to users.

In one implementation of the foregoing computer-readable memory, the content interaction data indicates, for each of the users, an amount of interaction with content of the content types on a video game console.

In another implementation of the foregoing computer-readable memory, the generating the combined user vectors comprises generating the combined user vectors based on the baseline content recommendations, the profile vectors, and the content vectors corresponding to a first time period, and the retrieving the interaction training data comprises retrieving the interaction training data corresponding to a second time period shorter than the first time period.

In another implementation of the foregoing computer-readable memory, the method further includes: generating a second user vector corresponding to a third time period for a particular user; and applying the second user vector to the recommendation model to identify content for recommendation to the particular user.

In another implementation of the foregoing computer-readable memory, the baseline content recommendations comprise a ranking of baseline content recommendations for each of the users.

In another implementation of the foregoing computer-readable memory, the generating the baseline content recommendation comprises outputting a ranked set of baseline content recommendations for each of the users.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for generating a machine-learning model for providing a content recommendation, the system comprising:

at least one processor; and memory that stores program code configured to be executed by the at least one processor, the program code comprising:

a baseline recommender configured to generate baseline content recommendations using historical user-content interactions by a plurality of users;

a personalized recommender comprising:

a profile vector generator configured to generate profile vectors corresponding to the users based on user profile information of the users;

a content vector generator configured to generate content vectors corresponding to the users based on content interaction data of the users;

a vector combiner configured to generate user vectors for the users, each user vector generated for a user corresponding to a first time period and including a baseline content recommendation of the baseline content recommendations, a profile vector of the profile vectors, and a content vector of the content vectors corresponding to the user; and a model generator configured to:

retrieve interaction training data corresponding to tracked interactions, by the users, with content of a plurality of content types corresponding to a second time period shorter than the first time period; and generate a recommendation model using a supervised machine-learning algorithm that receives the interaction training data and user vectors as inputs, the recommendation model configured to identify content for recommendation to users.

2. The system of claim 1, wherein the content interaction data indicates, for each of the users, an amount of interaction with content of the content types on a video game console.

3. The system of claim 1, wherein the vector combiner is configured to generate a second user vector corresponding to a third time period for a particular user; and
wherein the system further comprises:
an enhanced content recommendation engine configured to apply the second user vector to the recommendation model to identify content for recommendation to the particular user.

4. The system of claim 1, wherein the interaction training data comprises, for each of the users, a click-through rate indicating tracked interactions of the user with content for each of the content types.

5. The system of claim 1, wherein the baseline content recommendations comprise a ranking of baseline content recommendations for each of the users.

6. The system of claim 1, wherein the baseline recommender comprises a plurality of recommendation models, each recommendation model configured to generate baseline content recommendations using historical user-content interactions by the users.

7. The system of claim 1, wherein the first time period does not overlap with the second time period.

8. A method in a computing device for generating a machine-learning model for providing a content recommendation, the method comprising:
generating baseline content recommendations using historical user-content interactions by a plurality of users;
generating profile vectors corresponding to the users based on user profile information of the users;
generating content vectors corresponding to the users based on content interaction data of the users;
generating combined user vectors for the users, each user vector generated for a user corresponding to a first time period and including a baseline content recommendation of the baseline content recommendations, a profile vector of the profile vectors, and a content vector of the content vectors corresponding to the user;
retrieving interaction training data corresponding to tracked interactions, by the users, with content of a plurality of content types corresponding to a second time period shorter than the first time period; and
generating a recommendation model using a supervised machine-learning algorithm that receives the interaction training data and user vectors as inputs, the recommendation model configured to identify content for recommendation to users.

9. The method of claim 8, wherein the content interaction data indicates, for each of the users, an amount of interaction with content of the content types on a video game console.

10. The method of claim 8, further comprising:
generating a second user vector corresponding to a third time period for a particular user; and
applying the second user vector to the recommendation model to identify content for recommendation to the particular user.

11. The method of claim 8, wherein the interaction training data comprises, for each of the users, a click-through rate indicating tracked interactions of the user with content for each of the content types.

12. The method of claim 8, wherein the baseline content recommendations comprise a ranking of baseline content recommendations for each of the users.

13. The method of claim 8, wherein said generating the baseline content recommendation comprises generating the baseline content recommendations using historical user-content interactions by the users for each of a plurality of recommendation models.

14. The method of claim 8, wherein the first time period does not overlap with the second time period.

15. A computer-readable medium having computer program code recorded thereon that when executed by at least one processor causes the at least one processor to perform a method comprising:
generating baseline content recommendations using historical user-content interactions by a plurality of users;
generating profile vectors corresponding to the users based on user profile information of the users;
generating content vectors corresponding to the users based on content interaction data of the users;
generating combined user vectors for the users, each user vector generated for a user corresponding to a first time period and including a baseline content recommendation of the baseline content recommendations, a profile vector of the profile vectors, and a content vector of the content vectors corresponding to the user;
retrieving interaction training data corresponding to tracked interactions, by the users, with content of a plurality of content types corresponding to a second time period shorter than the first time period; and
generating a recommendation model using a supervised machine-learning algorithm that receives the interaction training data and user vectors as inputs, the recommendation model configured to identify content for recommendation to users.

16. The computer-readable medium of claim 15, wherein the content interaction data indicates, for each of the users, an amount of interaction with content of the content types on a video game console.

17. The computer-readable medium of claim 15, further comprising:
generating a second user vector corresponding to a third time period for a particular user; and
applying the second user vector to the recommendation model to identify content for recommendation to the particular user.

18. The computer-readable medium of claim 15, wherein the baseline content recommendations comprise a ranking of baseline content recommendations for each of the users.

19. The computer-readable medium of claim 15, wherein said generating the baseline content recommendation comprises outputting a ranked set of baseline content recommendations for each of the users.

20. The computer-readable medium of claim 15, wherein the first time period does not overlap with the second time period.

* * * * *